Patented Oct. 18, 1932

1,883,415

UNITED STATES PATENT OFFICE

FRITZ SEEBACH, OF ERKNER, NEAR BERLIN, GERMANY, ASSIGNOR TO BAKELITE GESELLSCHAFT MIT BESCHRANKTER HAFTUNG, OF BERLIN, GERMANY

PROCESS OF HARDENING PHENOL-ALDEHYDE CONDENSATION PRODUCTS

No Drawing. Application filed April 23, 1930, Serial No. 446,795, and in Germany June 21, 1929.

In the field of phenol-aldehyde resins, two main classes of condensation products are known,—the resoles and the novolaks. Of these two groups, the resoles possess the property of becoming insoluble and infusible upon heating. On the other hand, the novolaks do not show this characteristic, and consequently it is possible to convert the novolaks into insoluble, infusible products only by coupling with other materials, which give the novolak the hardenable characteristic of the resole due to the chemical combination. Whether to react to get resoles directly, or to employ a mixture of novolaks with hardening agents is determined by the advantages prevalent in each case. In preparing resoles the reaction products must not be heated too long, as they are easily converted by the heating into an insoluble state. However, if the reaction is controlled, a resin is produced which may be hardened by heat without the addition of any other materials. If it is desirable to react the novolak in a mixture with hardening agents, there is the advantage of being able to liberate the novolaks of admixtures to a greater extent than the resoles (perhaps even entirely) by prolonged heating. In order to convert the novolaks into hardenable resins several materials are in use in the art, e. g., formaldehyde, paraform in its various modified forms, hexamethylenetetramine, methyl aniline, as well as polymers and allied substances. The hardening effect of these is attributed to the methylene groups contained in them, and it is a general practice to speak of all compounds containing active methylene groups when referring collectively to the hardeners for the novolaks.

I have made the startling observation that there are substances, which are chemically unrelated to the above-mentioned materials, but nevertheless have a very good hardening effect on novolaks. These are substances of the quinone type; first, quinone (para-quinone, or benzoquinone) $C_6H_4O_2$ itself, as well as chloranil, $C_6Cl_4O_2$, the naphthoquinones, anthra-quinone, anthra-diquinone, phenanthraquinone, camphor quinone and the derivatives, and addition products of quinone, etc., for example, the addition compound of quinone with phenol or with anilin. In comparison with the hardening agents previously in use, especially the much-used hexamethylenetetramine, substances of the quinone type, for example, quinone, have very essential advantages. Quinone brings about the hardening of a novolak, without forming or splitting off any by-products whatever, which are undesirable, or which for example reduce the quality of a molded piece. Hexamethylenetetramine does not possess this advantage. Various properties of hexamethylenetetramine make it quite undesirable. In the first place, ammonia is formed in very considerable quantities. This ammonia freed in the hardening process swells the molded piece and also reduces its electrical insulating effect. Further, in the use of hexamethylenetetramine or other substances having active methylene groups, undesirable amounts of water are formed by the entrance of the methylene group in the resin molecule. These disadvantages are avoided by using quinone as a hardening agent, since, as my experiments show, no volatile substances are formed. Quinone is used in the same way as the hardening agents containing methylene groups, e. g. hexamethylenetetramine. No special precautions need be taken to apply the prior art methods to the use of quinone.

In using quinone I proceed for example as follows: 90 parts novolak are ball-milled with 10 parts of quinone, and are then mixed with 100 parts of filler, as, for example, wood flour. The substance may be easily worked into any kind of molded piece whereby the above-mentioned advantages may be obtained.

The use of quinone is not restricted to the manufacture of molded pieces, but valuable varnishes may also be prepared in like manner. The process for example is as follows:—85 parts of novolak and 15 parts of quinone are dissolved in 100 parts wood alcohol. The solution is then refluxed for about an hour; however, the solution may also be made at ordinary temperature in a tumbling barrel. When used in a way analogous to hexamethylenetetramine it is possible for quinone to combine not only with novolaks, but also with resoles, in order to shorten the hardening time of these resins, which will also harden of their own accord. Quinone may also be used, mixed in with one or more other hardeners. The simultaneous application of quinone and hexamethylenetetramine, for example, offers the advantage that the quinone combines with the ammonia liberated from the hexamethylenetetramine, and thus the liberation of ammonia is prevented.

The preparation of resins to be hardened and their further application with the new hardeners may take place in any desired manner. Thus it is possible to use condensation products, which have been produced in the presence of acid or basic catalysts or without catalysts. A mixture of several condensation products may also be used. The procedure may be in such a way that the non-hardenable resins are prepared first and the hardeners are then added to the reaction mass; or else the condensation products may be freed of impurities by washing, distillation or otherwise, and hardening agents added to the products thus obtained directly after the completion of the washing operation, or in a separate operation. It is further possible to proceed by first making novolaks, and then adding additional phenol and methylene-containing hardeners along with hardeners of the quinone type, either directly after condensation or in a second operation. In order to accelerate the hardening, certain accelerators may be added to the resins, either before, simultaneously with, or after the addition of hardeners. According to the kind of resins used and the properties desired in the product to be made the process of hardening may be effected in any way whatever, i. e. by heat alone, by simultaneous heat and pressure, or by molding of the mixture at ordinary or relatively low temperature and subsequently heating the molded articles or the like.

I claim:

1. Process of hardening phenol-aldehyde condensation products characterized by the addition of a hardening agent including a substance of the quinone type.

2. Process of hardening phenol-aldehyde condensation products characterized by the addition of a hardening agent including a substance of the quinone type and a methylene-containing substance.

3. Process of hardening phenol-aldehyde condensation products characterized by the addition of a quinone as a hardening agent.

4. Process of hardening a fusible phenol-aldehyde condensation product which comprises adding a substance of the quinone type to the condensation product, and applying heat thereto.

5. Composition of matter comprising a phenol-aldehyde condensation product of a novolak type in admixture with a hardening agent including a quinone.

6. The reaction product of a phenol-aldehyde condensation product and a substance of the quinone type.

In testimony whereof, I affix my signature.

FRITZ SEEBACH.